(12) United States Patent
Lupescu et al.

(10) Patent No.: US 10,105,691 B2
(45) Date of Patent: Oct. 23, 2018

(54) MULTIPLE ZEOLITE HYDROCARBON TRAPS

(71) Applicant: FORD GLOBAL TECHNOLOGIES, LLC, Dearborn, MI (US)

(72) Inventors: Jason Aaron Lupescu, Wayne, MI (US); Giovanni Cavataio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 15/086,832

(22) Filed: Mar. 31, 2016

(65) Prior Publication Data

US 2017/0282166 A1    Oct. 5, 2017

(51) Int. Cl.

| | | |
|---|---|---|
| *B01J 29/06* | (2006.01) | |
| *B01J 29/70* | (2006.01) | |
| *B01J 29/65* | (2006.01) | |
| *B01J 29/08* | (2006.01) | |
| *B01J 29/068* | (2006.01) | |
| *B01J 35/10* | (2006.01) | |
| *B01J 29/80* | (2006.01) | |
| *B01J 20/18* | (2006.01) | |
| *B01J 20/28* | (2006.01) | |
| *B01D 53/94* | (2006.01) | |
| *B01J 29/74* | (2006.01) | |
| *B01J 29/72* | (2006.01) | |
| *B01J 29/78* | (2006.01) | |
| *B01J 29/44* | (2006.01) | |
| *B01J 29/88* | (2006.01) | |
| *B01J 29/14* | (2006.01) | |
| *B01J 29/12* | (2006.01) | |
| *B01J 29/46* | (2006.01) | |
| *B01J 29/10* | (2006.01) | |
| *B01J 29/69* | (2006.01) | |
| *B01J 29/67* | (2006.01) | |
| *B01J 29/16* | (2006.01) | |
| *B01J 29/68* | (2006.01) | |
| *B01J 29/76* | (2006.01) | |

(52) U.S. Cl.
CPC ........ *B01J 29/7015* (2013.01); *B01D 53/945* (2013.01); *B01D 53/9486* (2013.01); *B01J 20/18* (2013.01); *B01J 20/2808* (2013.01); *B01J 29/068* (2013.01); *B01J 29/084* (2013.01); *B01J 29/106* (2013.01); *B01J 29/126* (2013.01); *B01J 29/146* (2013.01); *B01J 29/166* (2013.01); *B01J 29/44* (2013.01); *B01J 29/46* (2013.01); *B01J 29/65* (2013.01); *B01J 29/67* (2013.01); *B01J 29/68* (2013.01); *B01J 29/69* (2013.01); *B01J 29/743* (2013.01); *B01J 29/7415* (2013.01); *B01J 29/7615* (2013.01); *B01J 29/783* (2013.01); *B01J 29/7815* (2013.01); *B01J 29/80* (2013.01); *B01J 29/88* (2013.01); *B01J 35/1057* (2013.01); *B01D 2255/50* (2013.01); *B01D 2255/904* (2013.01); *B01D 2255/9022* (2013.01); *B01D 2255/9025* (2013.01); *B01D 2255/912* (2013.01)

(58) Field of Classification Search
CPC . B01J 29/65; B01J 29/084; B01J 29/44; B01J 29/46; B01J 29/88; B01J 29/068; B01J 29/80; B01J 29/106; B01J 29/126; B01J 29/146; B01J 29/166; B01J 29/67; B01J 29/68; B01J 29/69; B01J 29/7415; B01J 29/7615; B01J 29/743; B01J 29/723; B01J 29/7815; B01J 29/783; B01D 2255/50; B01D 2255/9022; B01D 2255/9025; B01D 2255/912; B01D 2255/904
USPC ......... 502/64, 74, 77, 78, 79, 406, 407, 411, 502/414, 526
See application file for complete search history.

(56) References Cited

U.S. PATENT DOCUMENTS

| | | | |
|---|---|---|---|
| 5,538,697 A | 7/1996 | Abe et al. | |
| 6,074,973 A * | 6/2000 | Lampert | B01D 53/945 423/213.2 |
| 6,319,484 B1 * | 11/2001 | Shore | B01D 53/869 422/173 |

(Continued)

FOREIGN PATENT DOCUMENTS

| | | | |
|---|---|---|---|
| EP | 1 301 264 | * | 1/2005 |
| WO | 2008/132452 A2 | | 11/2008 |

OTHER PUBLICATIONS

Yeon, T.H. et al., "Adsorption and desorption characteristics of hydrocarbons in multi-layered hydrocarbon traps," Microporous and Mesoporous Materials, 119 (2009), pp. 349-355.

*Primary Examiner* — Elizabeth D Wood
(74) *Attorney, Agent, or Firm* — Julia Voutyras; Brooks Kushman P.C.

(57) ABSTRACT

Hydrocarbon (HC) traps are disclosed. The HC trap may include a first zeolite material having an average pore diameter of at least 5.0 angstroms and configured to trap hydrocarbons from an exhaust stream and to release at least a portion of the trapped hydrocarbons at a temperature of at least 225° C. The HC trap may also include a second zeolite material having an average pore diameter of less than 5.0 angstroms or larger than 7.0 angstroms. One or both of the zeolite materials may include metal ions, such as transition, Group 1A, or platinum group metals. The HC trap may include two or more discrete layers of zeolite materials or the two or more zeolite materials may be mixed. The multiple zeolite HC trap may form coke molecules having a relatively low combustion temperature, such as below 500° C.

20 Claims, 7 Drawing Sheets

(56) References Cited

U.S. PATENT DOCUMENTS

| | | | |
|---|---|---|---|
| 6,504,074 B2 * | 1/2003 | Verduijn | B01J 29/80 |
| | | | 502/67 |
| 6,667,018 B2 | 12/2003 | Noda et al. | |
| 6,912,847 B2 | 7/2005 | Deeba | |
| 8,906,820 B2 | 12/2014 | Fedeyko et al. | |
| 8,926,910 B2 * | 1/2015 | Lupescu | F01N 3/0807 |
| | | | 422/177 |
| 9,138,731 B2 | 9/2015 | Chandler et al. | |
| 2002/0187891 A1 * | 12/2002 | Verduijn | B01J 29/005 |
| | | | 502/67 |
| 2004/0029716 A1 * | 2/2004 | Mohr | B01J 29/06 |
| | | | 502/67 |
| 2008/0159936 A1 * | 7/2008 | Zones | B01D 53/945 |
| | | | 423/213.5 |
| 2011/0305614 A1 * | 12/2011 | Stiebels | B01D 53/9418 |
| | | | 423/213.5 |
| 2012/0275977 A1 * | 11/2012 | Chandler | B01D 53/9418 |
| | | | 423/213.5 |

* cited by examiner

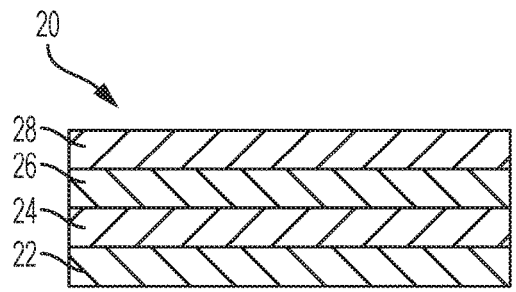
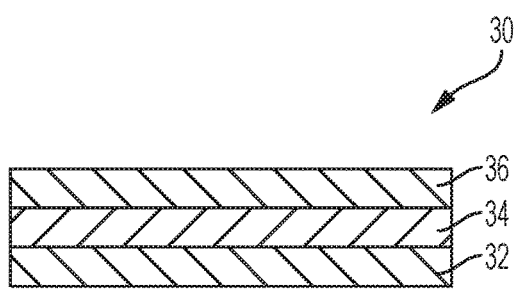
FIG. 9    FIG. 10
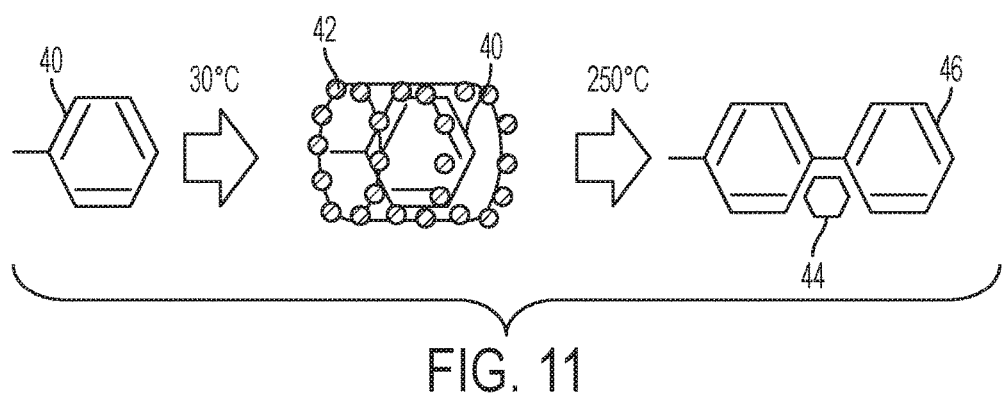
FIG. 11

MULTIPLE ZEOLITE HYDROCARBON TRAPS

TECHNICAL FIELD

The present disclosure relates to hydrocarbon traps that include multiple zeolites, for example, for vehicle exhaust systems.

BACKGROUND

Reduction of tailpipe emissions is a constant goal in the automotive industry. As the standards for emissions continue to decrease, technologies must continually improve to meet the standards. Fleet average non-methane organic gas (NMOG) hydrocarbons and oxides of nitrogen (NOx) tailpipe emissions based on the 2015 model year standards need to be reduced by 70% to meet new LEV-III SULEV30 (Super Ultra-Low Emission Vehicle) level by the 2025 model year. Of these two regulated pollutants, Hydrocarbon (HC) cold start emissions emitted in the first 60 seconds after cold (70° F.) engine start may make up about 90% of the total federal drive cycle (e.g., FTP-75 or US06) NMOG emissions. Therefore, cold start HC is one challenge for emission reduction and many efforts have been focused on this area. The traditional approaches to reducing cold start HC emissions include developing catalysts that can warm up quickly and light-off at lower temperatures and optimizing engine cold start conditions to deliver heat to the catalyst as quickly as possible. However, even with very fast catalyst light-off, there are generally at least tens of seconds during cold start when the catalyst is not warm enough to convert any HC species. For the SULEV30 level emission standard, this amount of HC is important and may require additional development.

SUMMARY

In at least one embodiment, a hydrocarbon trap is provided. The HC trap may include a first zeolite material having an average pore diameter of at least 5.0 angstroms and configured to trap hydrocarbons from an exhaust stream and to release at least a portion of the trapped hydrocarbons at a temperature of at least 225° C.; and a second zeolite material having an average pore diameter of less than 5.0 angstroms or larger than 7.0 angstroms.

The second zeolite material may be configured to react with the hydrocarbons that are released from the first zeolite material to form coke molecules. In one embodiment, the second zeolite material is configured to form coke molecules having a combustion temperature of less than 500° C. The first zeolite material may be a beta (BEA), mordenite (MOR) or ZSM-5 (MFI) type zeolite. The second zeolite material may be a chabazite (CHA), ferrierite (FER), or ultra-stable Y (FAU) type zeolite. In one embodiment, the first zeolite material has a $Si/Al_2$ ratio of 20-50. The first zeolite material may include from 0.1 to 10 wt. % metal ions. The metal ions may include one or more of Group 1A metals, transition metals, and platinum group metals.

In one embodiment, the second zeolite material includes from 0.1 to 10 wt. % metal ions. In another embodiment, the first zeolite material is a beta-type zeolite and the second zeolite material is a chabazite-type zeolite. The second zeolite material may have a $Si/Al_2$ ratio of 5-20. One or both of the first and second zeolite materials may include at least 0.5 wt. % platinum group metals. In one embodiment, the HC trap may further include a third zeolite material having a different composition than the first and second zeolite materials. In another embodiment, a $Si/Al_2$ ratio of the first zeolite material is from 20 to 50 and the first zeolite material includes at least one of a platinum group metal (PGM), a Group 1A metal, and a transition metal. A Me/Al ratio of the first zeolite material may be 0.01 to 0.20 for PGM or 0.1 to 2.0 for Group 1A or transition metals.

In at least one embodiment, a hydrocarbon trap is provided. The HC trap may include a first zeolite layer having an average pore diameter of at least 5.0 angstroms and configured to release trapped hydrocarbons at a temperature of at least 225° C.; and a second zeolite layer having an average pore diameter of less than 5.0 angstroms and configured to react with the hydrocarbons that are released from the first zeolite layer to form coke molecules.

In one embodiment, the second zeolite layer is disposed over the first zeolite layer and a three-way catalyst layer is disposed over the second zeolite layer. The first zeolite layer may include from 1 to 10 wt. % metal ions and the second zeolite layer may include at least 1 wt. % transition metal ions.

In at least one embodiment, a hydrocarbon trap is provided. The HC trap may include a zeolite mixture including a first zeolite material interspersed with a second zeolite material; the first zeolite material having an average pore diameter of at least 5.0 angstroms and configured to release trapped hydrocarbons at a temperature of at least 225° C.; and the second zeolite material having an average pore diameter less than 4.5 angstroms or more than 7.0 angstroms.

In one embodiment, the first zeolite material includes from 0.1 to 10 wt. % metal ions and the second zeolite material includes 0.1 to 10 wt. % transition metal ions. The first zeolite material may not include substantially any ion-exchanged copper ions and the second zeolite material may include at least 2 wt. % copper. In another embodiment, a $Si/Al_2$ ratio of the first and/or second zeolite material is from 20 to 50 and the first and/or second zeolite material includes at least one of a platinum group metal (PGM), a Group 1A metal, and a transition metal. A Me/Al ratio of the first and/or second zeolite material may be 0.01 to 0.20 for PGM or 0.1 to 2.0 for Group 1A or transition metals.

BRIEF DESCRIPTION OF THE DRAWINGS

FIG. 9 is a schematic cross-section of a HC trap including multiple layers of different zeolites, according to an embodiment;

FIG. 10 is a schematic cross-section of a HC trap including a layer of mixed zeolite, according to an embodiment;

FIG. 11 is a schematic of HC adsorption and coke molecule formation in the disclosed HC traps, according to an embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A different approach to reducing cold start hydrocarbon (HC) emission is an HC-trap catalyst. In general, HC-Traps are configured to adsorb engine-out HCs during cold start and convert them when the precious metal-based TWC (Three-Way-Catalyst) layer is warmed up. Several embodiments of HC traps are disclosed and described in U.S. application Ser. No. 14/831,075 filed Aug. 20, 2015, the disclosure of which is hereby incorporated in its entirety by reference herein. Elements of the HC traps in said application may be incorporated into the disclosed HC traps herein.

Figure 1:
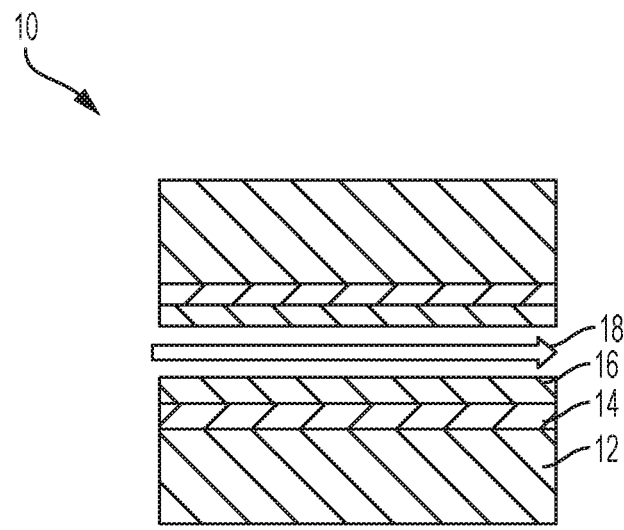
FIG. 1 is a schematic cross-section of a hydrocarbon (HC) trap, according to an embodiment.

HC-traps disclosed herein may be used in automotive exhaust systems, for example, for gasoline or diesel engines. An example of an HC-trap catalyst 10 (HCTC) is shown in FIG. 1. The HC-trap catalyst 10 may include a substrate 12, which may have a plurality of channels or openings through which the exhaust gas passes. The substrate 12 may be a monolith or extruded material, such as cordierite. A trap layer 14 may be disposed on and cover at least a portion of the substrate 12. The trap layer 14 may include a zeolite material coated on the substrate 12. Zeolites are microporous, aluminosilicate minerals including interlinked tetrahedra of alumina ($AlO_4$) and silica ($SiO_4$). The ratio of silica to alumina in the zeolite may be adjusted. For example, a zeolite with a ratio of 100 may be a zeolite with a $Si/Al_2$ ratio to 100:1, a zeolite with a ratio of 200 may be a zeolite with a $Si/Al_2$ ratio to 200:1, and so forth. A TWC layer 16 may be coated on top of the trap layer 14. In general, the HC-trap catalyst works by adsorbing HC in the trap layer 14 during cold start and releasing it when the trap layer 14 is warmed up. Meanwhile, the TWC layer 16 may be heated by the exhaust gas 18 and converts the released HC from trap layer 14 when TWC layer 16 is warm enough to be in its operating range.

The challenge for this approach is that TWC generally needs a considerably high temperature (e.g., above 250° C.) for HC light-off and zeolites normally release most HCs before the TWC is hot enough to convert HCs. This present disclosure aims to at least partially address this issue by facilitating the formation and burning/combusting of coke molecules using a combination of two or more zeolites. As known to those of ordinary skill in the art, the term "coke" may refer to relatively large or heavy hydrocarbon molecules that may form within a zeolite. The coke molecules may be formed by reactions between hydrocarbons and/or reactions between hydrocarbons and the zeolite. The coke molecules may begin as relatively small coke molecules and may progressively grow and increase in size as further reactions occur. The coke molecules may grow to be larger than the pore size of the zeolite and may therefore become trapped. Coke molecules may begin to block the pores of the zeolite over time. In some instances, burning the coke may be the only feasible or practical way to remove it from the zeolite. However, some coke molecules may require very high temperatures to burn/combust, such as above 650° C. This may pose a difficulty, particularly for meeting certain drive cycle standards (e.g., FTP-75 or US06). To reach the high temperatures necessary to burn these coke molecules, a fuel-cut may have to be performed to increase the oxygen level.

Accordingly, in at least one embodiment, a goal of the disclosed HC trap is to form coke that burns/combusts at a relatively low temperature (e.g., 600° C. or less). However, current zeolites generally do not form coke and/or do not form low temperature coke under normal operating conditions. Examples of zeolite types (and structure codes) that may be used include beta (BEA), X (FAU), Y (FAU), mordenite (MOR), ZSM-5 (MFI), chabazite (CHA), Ultra-Stable Y or USY (FAU), ferrierite (FER), or others of similar pore size. For example, beta zeolite has a pore size (about 5.5 to 6.7 angstroms) that is close to several HC species that are of interest to automotive applications, such as toluene (6.7 angstroms) and propylene (5.0 angstroms). Chabazite, another type of zeolite, has a smaller pore size than beta zeolite (e.g., about 3.8 angstroms) and generally does not (or cannot) absorb HC species having sizes larger than its pores, such as toluene and propylene. Examples of HC species and their typical sizes (in angstroms) include o-xylene (7.4), toluene (6.7), benzene (6.7), iso-octane (5.6), iso-pentane (5.6), iso-butene (5.6), propylene (5.0), ethanol (4.4), acetaldehyde (4.4), ethylene (4.2), and acetylene (2.4). Examples of zeolite types and typical properties are shown below in Table 1.

TABLE 1

| Zeolites Types | Example IZA code | Pore diameter | Ring size | Pore structure |
| --- | --- | --- | --- | --- |
| Y-type | FAU | 7.4 × 7.4 | 12 | 3D |
| Beta | BEA | 6.6 × 6.7 | 12 | 3D |
|  |  | 5.5 × 5.6 | 12 |  |
| Mordenite | MOR | 6.5 × 7.0 | 12 | 1D |
|  |  | 3.4 × 4.8 | 8 |  |
|  |  | 2.6 × 5.7 | 8 |  |
| ZSM-5 | MFI | 5.3 × 5.6 | 10 | 3D |
|  |  | 5.1 × 5.5 | 10 |  |
| Ferrierite | FER | 4.2 × 5.4 | 10 | 2D |
|  |  | 3.5 × 4.8 | 8 |  |
| Chabazite | CHA | 3.8 × 3.8 | 8 | 3D |

Figure 2:
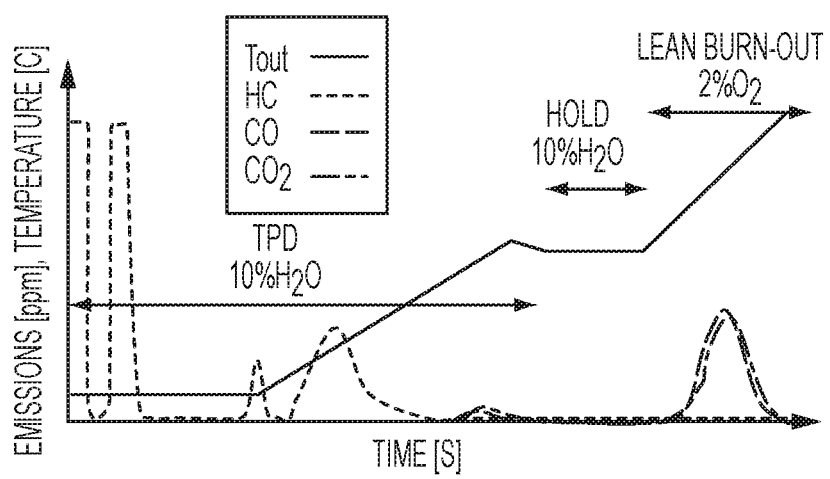
FIG. 2 is a schematic of a temperature programmed desorption (TPD) and lean burn-out procedure, according to an embodiment.
Figure 3:
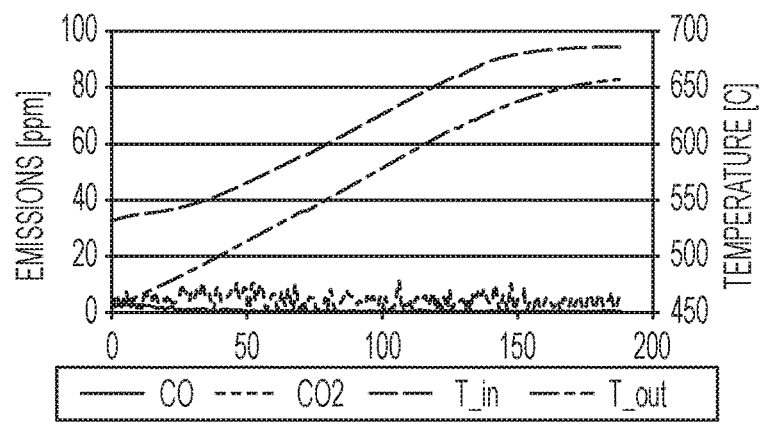
FIG. 3 is example data from a lean burn-out test of a copper-chabazite zeolite.
Figure 4:
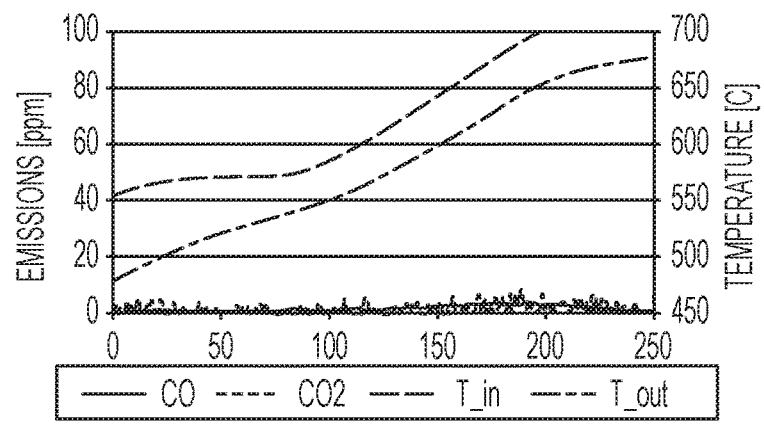
FIG. 4 is example data from a lean burn-out test of a beta zeolite.

With reference to FIGS. 2-4, data is shown for two example lean burn-out tests. FIG. 2 shows a schematic of the lean burn-out test process. The HC trap is initially loaded using a HC blend that is fed to the HC trap for a certain period of time (e.g., 30 seconds). The feed gas is then changed to flush out any non-adsorbed HCs using a different feed gas. The HC blend is then fed into the HC trap again and the temperature is ramped to a temperature that may approximate a maximum operating temperature. Then the feed may be switched to a blend of oxygen and nitrogen and the temperature further increased to perform a lean burn-out of any remaining hydrocarbons or carbon within the HC trap.

In the examples shown in FIGS. 3 and 4, the process parameters included using a feed of "cold-start" gas at 3 L/min of 0.18% HC blend, 0.2% CO, 0.08% $H_2$, 10% $H_2O$ vapor and air at 25° C. The HC blend was composed of (Vol %): ethanol 27%, acetaldehyde 5%, toluene 12%, iso-pentane 16% and propylene 40% (total C1 basis 6600 ppm). The feed was measured in bypass then sent to reactor for a 30 second pulse then back to bypass. The feed was then changed to 10% $H_2O$ and $N_2$. Once the HC vanished for 30 seconds, the feed was sent back to the HC trap sample simultaneous with an oven ramp to 600° C. at 80° C./min. Once emissions at FTIR were stabilized, the water was turned off, the sample tube was shifted so that the sample core was moved inside an oven heating coil region, and the oven was set to heat the sample to 700° C. simultaneous with feed gas containing 2% $O_2$ and $N_2$.

With reference to FIG. 3, the HC trap material tested was a chabazite zeolite (CHA) including copper (e.g., 2.0-4.0 wt. %). The HC trap was fresh (non-aged). FIG. 3 shows the result of the lean burn-out from 450° C. to about 650° C. for the outlet temperature. As shown by the near-zero and flat levels of both CO and $CO_2$ emissions, there was no coke formed within the Cu-CHA zeolite during the test. This is not unexpected, since, as described above, chabazite has a relatively small pore size that does not allow most HC species to become trapped inside. Therefore, the HC species may not react to form coke molecules within the Cu-CHA zeolite.

With reference to FIG. 4, the HC trap material tested was a beta zeolite (BEA) without any metal cations included therein. The zeolite had a relatively high $Si/Al_2$ ratio (e.g., 300±200). The HC trap was fresh. Similar to the chabazite trap in FIG. 3, the CO and $CO_2$ emissions are flat from 450° C. to about 675° C., indicated that no coke was formed within the BEA zeolite during the test. This is also not unexpected, since although beta zeolites include pores sized to trap HC species, the relative lack of reactive sites in the high $Si/Al_2$ BEA makes it unlikely to form any coke molecules.

Figure 5:
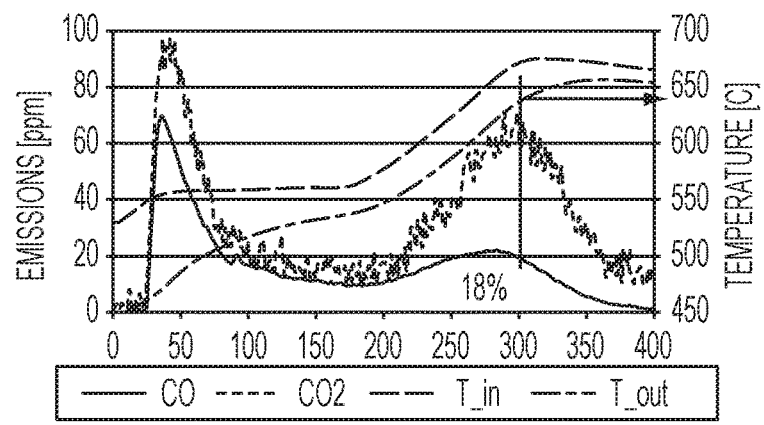
FIG. 5 is example data from a lean burn-out test of a mixed copper-chabazite zeolite and a beta zeolite showing the formation and burning of coke.

With reference to FIG. 5, however, it was surprisingly discovered that a mixture of beta and Cu-chabazite zeolites formed coke molecules. The HC trap material tested in FIG. 5 was a fresh 1:1 mixture of Cu-CHA having a relatively low $Si/Al_2$ ratio (e.g., 50±40) and a BEA having a relatively high $Si/Al_2$ ratio (e.g., 300±200). Therefore, the same chabazite zeolite tested in FIG. 3 was mixed with beta zeolite similar to that tested in FIG. 4. As shown in FIG. 5, two forms of coke molecules were formed in the mixture of zeolites. A first, low-temperature (LT) form of coke was formed that burned/combusted at about 480° C. and a second, high-temperature (HT) form of coke was formed that burned/combusted at about 640° C. The presence of coke is shown by a spike in the $CO_2$ and CO, products of burning coke, at these temperatures.

Accordingly, a mixture of two zeolites that did not produce coke on their own unexpectedly formed coke when combined. Without being held to any particular theory, it is believed that at least two mechanisms of coke formation may be formed when the two zeolites were mixed. One mechanism may be the migration of loose (e.g., not ion-exchanged) copper ions from the Cu-CHA zeolite to the high $Si/Al_2$ ratio BEA zeolite during the initial washcoat calcination or from in-use operation between about 500-700° C., which is at or above the Tamman temperature for copper (e.g., 405° C.) and copper oxides (e.g., 527° C.). The loose copper ions may migrate to the beta zeolite and allow for reactions to take place between the copper ions and trapped HCs, thereby forming coke. Another mechanism may be that the beta zeolite trapped and held HCs at relatively low temperatures and released them at a higher temperature. At the higher temperature, the released HCs may have come in contact with the loose copper ions in the Cu-CHA and reacted to form coke molecules. The loose Cu ions may be located at the surface of the Cu-CHA, since the chabazite pores may be too small for the HCs to enter. Therefore, a synergistic effect may occur when two zeolites are combined, despite neither of them forming coke molecules individually.

Figure 6:
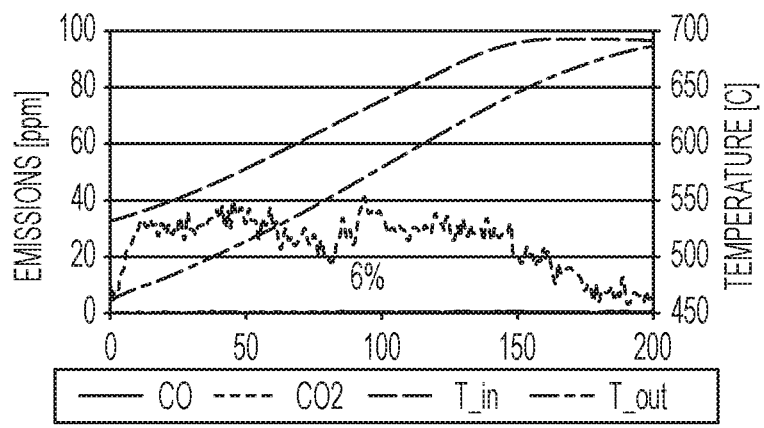
FIG. 6 is example data from a lean burn-out of the mixed zeolite of FIG. 5 with a three-way catalyst (TWC) added.

With reference to FIG. 6, a three-way catalyst (TWC) layer including palladium (Pd) was added to a similar mixed low $Si/Al_2$ ratio Cu-CHA and high $Si/Al_2$ ratio BEA zeolite. As shown in the graph, the peaks in the amount of $CO_2$ released were reduced, indicating that the added Pd helped to burn the coke. This oxidation may occur earlier in the temperature programmed desorption phase so that less desorbed HC could elute through the length of the core sample and form coke on the copper particles or Cu-CHA surface.

Figure 7:
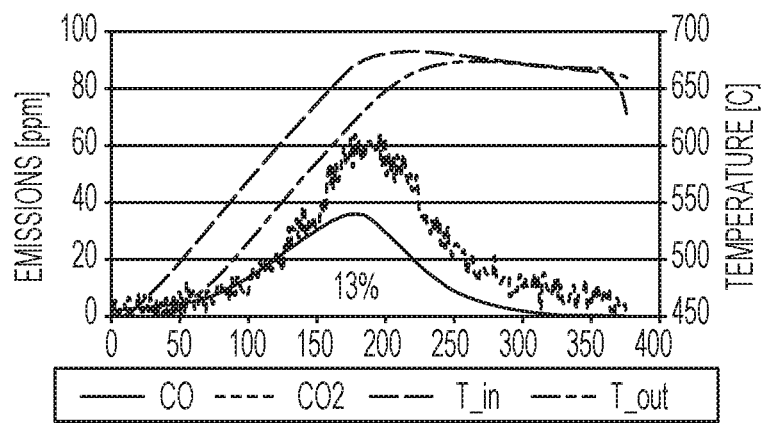
FIG. 7 is example data from a lean burn-out test of a beta zeolite with added copper.

To support the theorized mechanisms, additional tests were performed to try and replicate the two forms of coke (LT and HT). With reference to FIG. 7, a similar lean burn-out procedure was performed on a high $Si/Al_2$ ratio BEA zeolite with 0.7 wt. % copper added. As shown, the CO and $CO_2$ levels peak at a temperature of around 640° C.—similar to the HT coke that was formed in the mixed zeolite. Accordingly, this data appears to confirm or support the theory that loose copper ions from the Cu-CHA may have migrated to the BEA zeolite in the mixed zeolite.

Figure 8:
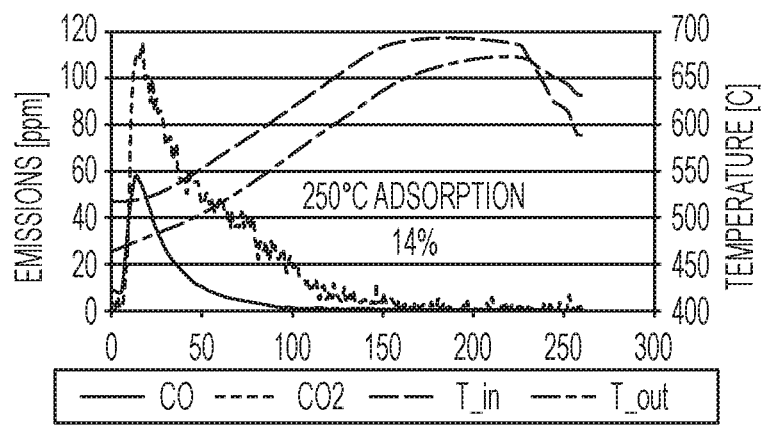
FIG. 8 is example data from a lean burn-out test of a copper-chabazite zeolite using an adsorption/desorption temperature of 250° C.

With reference to FIG. 8, a lean burn-out procedure was performed on a Cu-CHA zeolite similar to the Cu-CHA zeolite in the mixed zeolite. However, the HC adsorption was performed at an elevated temperature of 250° C. This elevated adsorption temperature may simulate the release of the HC from the BEA zeolite in the mixed zeolite. As shown, the CO and $CO_2$ levels peak at a temperature of around 480° C.—similar to the LT coke that was formed in the mixed zeolite. Accordingly, this data appears to confirm or support the theory that HCs released from the beta zeolite at an elevated temperature may contact the chabazite zeolite and react with copper ions at the surface to form coke molecules. These coke molecules burn/combust at a lower temperature than the coke molecules formed from Cu-BEA, and therefore it may be preferable to form this LT coke because it can be burned off at normal operating temperatures.

Accordingly, in view of the above unexpected results, HC-traps are disclosed that includes multiple zeolites and/or a mixture of zeolites. In the example shown in FIG. 9, an HC-trap 20 is shown. In this embodiment, the HC-trap 20 includes four layers—the substrate 22, a first trap layer 24, a second trap layer 26, and a catalyst (e.g., TWC) layer 28. As disclosed above, the substrate 22 may be a monolith or extruded material, such as cordierite. However, in some embodiments, zeolite layers 24 and 26 may be mixtures of the zeolites applied in one or two coats, the substrate monolith may be an extruded zeolite and may integrate elements of 22 with 24, or 22 with 24 and 26, and/or layer 28 can be multiple TWC layers. The first trap layer 24 may include a first zeolite material and the second trap layer 26 may include a second, different zeolite material. In one embodiment, one of the first and second zeolite materials may be a storage zeolite and the other may be a coking zeolite. For example, the first zeolite material may be a storage zeolite and the second zeolite material may be a coking zeolite (or vice versa). In one embodiment, the storage zeolite may be positioned below or under the coking zeolite. For example, the storage zeolite may be the first trap layer 24 and the coking zeolite may be the second trap layer 26 in FIG. 9. This may allow the HCs that desorb from the storage zeolite to rise and contact the coking zeolite when they are released from the storage zeolite. However, the order of the zeolite materials may also be reversed. The relative size of the layers, by height or by weight, may be expressed as a ratio. In one embodiment, the ratio of the size of the first layer to the second layer may be from 1:9 to 9:1. In other embodiments, the ratio may range from 1:7 to 7:1, 1:5 to 5:1, 1:3 to 3:1, or 1:2 to 2:1. In one embodiment, the layers may be approximately the same size, or a ratio of about 1:1.

With reference to FIG. 10, an HC-trap 30 is shown. The HC-trap 30 may include a substrate 32, similar to the substrate 22. The trap may include a mixed-zeolite layer 34 disposed over and/or contacting the substrate 32. However, in some embodiments, there may be no substrate layer beneath the mixed-zeolite layer 34. Instead, the mixed-zeolite layer 34 may be an extruded zeolite. A catalyst (e.g., TWC) layer 36 may be disposed over and/or contact the mixed-zeolite layer 34. The mixed-zeolite layer 34 may include at least two different zeolite materials or types therein. The at least two different zeolite materials may include a storage zeolite and a coking zeolite, similar to HC-trap 20. The zeolites tested in FIGS. 5 and 6 are examples of mixed zeolites, and were mixed with a 1:1 ratio by weight. However, a ratio of 1:1 is not required, and other ratios may be used. For example, in a mixed zeolite having two different zeolite materials, the ratio may range from 1:9 to 9:1 of the first material to the second material (e.g., 10% to 90% of first material and 10% to 90% of the second material). In other embodiments, the ratio may range from 1:7 to 7:1, 1:5 to 5:1, 1:3 to 3:1, or 1:2 to 2:1. As used herein, the term "mixed-zeolite layer" may refer to a combination of two or more materials in which they are interspersed with each other relatively uniformly mixed within the layer. The zeolites may be interspersed throughout an entire thickness of the layer 34. The mixture may be uniform or homogeneous. Accordingly, the term "mixed-zeolite layer" may be distinguished from the embodiment shown in FIG. 9 where there are discrete layers of a single zeolite material in contact with each other along a surface.

As described above, one of the zeolite materials in either the layered or mixed zeolites may be a storage zeolite. In at least one embodiment, the storage zeolite meets two general criteria to be selected. First, it should be a type of zeolite that has pore sizes sufficient to receive and trap the common HC species that are encountered in vehicle exhaust, for example, for E10 fuel, the species may include toluene, propylene, iso-pentane, and ethylene. As described above, beta zeolites may be suitable as the storage zeolite. However, other zeolites having similar pore sizes and/or HC trapping properties may also be used. For example, zeolites having a pore diameter (e.g., average pore diameter) of about 5.0 to about 7.0 angstroms, or any sub-range therein, such as 5.0 to 7.0, 5.5 to 7.0, or 5.0 to 6.5 angstroms may be suitable storage zeolites. Second, the storage zeolite should release the majority of stored HCs at a relatively high temperature, with peak desorption near 200° C. to 250° C. For example, the storage zeolite may release the majority of stored HCs at a relatively high temperature, with peak desorption of at least 225° C. Non-limiting examples of commonly available zeolite types that may be used as the storage zeolite may include beta (BEA), mordenite (MOR), or ZSM-5 (MFI), although other zeolites that fit these criteria may be made in the future.

The HC-traps may also include a second coking zeolite or coking agent. The coking zeolite may be a zeolite that stores HCs with lower efficiency relative to the storage zeolite, but that significantly contributes to the formation of coke molecules in the HC-trap. In one embodiment, the coking zeolite may be the primary source of the coke formation. While in another embodiment, the second zeolite functions as a temporary storage zeolite where it strongly bonds with HC released from the first storage zeolite. Later, at a higher temperature, the HC bonds may break and the HC is coked in or on the first storage zeolite and/or the second coking zeolite. The coking zeolite may be a type of zeolite that has pore sizes that are outside (e.g., above or below) that of the range specified for the first storage zeolite of 5.0-7.0 angstroms that fit some or all of the common HC species in automotive exhaust, such as toluene, propylene, iso-pentane, and ethylene. In one embodiment, the zeolites suitable for the coking zeolite may be those having a pore diameter (e.g., average pore diameter) of 5.5 angstroms or less, for example, 5.0 angstroms or less, 4.5 angstroms or less, or 4.0 angstroms or less. Non-liming examples of zeolite types that may be used as the coking zeolite may include chabazite (CHA) or ferrierite (FER). In one embodiment, the zeolites suitable for the coking zeolite may be those having a pore diameter (e.g., average pore diameter) of 7.4 angstroms or more. Non-liming examples of zeolite types that may be used as the coking zeolite may include ultra-stable Y (FAU) also abbreviated USY. Since 7 angstroms is on the upper edge of common zeolite pore size, other larger pore (>20 angstroms) materials such as mesoporous alumina may also fit the second coking agent criteria.

The storage and/or coking zeolites may have one or more types of metal ions incorporated therein as coking agents and/or oxidation catalysts. For example, the metal ions may be ion-exchanged or they may be loose (e.g., not incorporated into the zeolite framework). In one embodiment, the metal ions may be transition metal ions, such as copper, nickel, manganese, or others. Copper may be one of the most effective coking agents for aromatics and alkenes. However, metal ions other than transition metals may also be included, such as Group 1A metals or platinum group metals (PGM). The metal ions may serve as active sites for coke molecule formation and growth, or coke combustion. Metal ions may also be incorporated into the storage zeolite to prevent other metals from the coking zeolite migrating and forming high-temperature coke. In one embodiment, the coking zeolite may include at least 0.1, 1, 2, 3, 4, or 5 wt. % metal ions. For example, the coking zeolite may include from 1 to 10 wt. % metal ions, or any sub-range therein, such as 1 to 8 wt. %, 2 to 8 wt. %, 2 to 7 wt. %, 1 to 5 wt. %, 1 to 3 wt. %, or others. While specific wt. % of metal ions are specified above, these ranges are merely examples. Elements such as Li (Group IA) and Pd (PGM) have different atomic masses, so metal ion ($Me^+$) content may be specified at an exchange level relative to the aluminum ion ($Al^-$) framework content of the zeolite as an atomic ratio (Me/Al). For example, for a zeolite with a $Si/Al_2$ ratio in the range of 20 to 50, the Me/Al content may be about 0.01 to 0.20 for PGM metals (e.g., Pt, Pd, Rh) and 0.1 to 2.0 for other metals (e.g., Group 1A, transition).

of the primary/storage zeolite may be an important factor in coke formation in the multiple zeolite HC-trap. Table 2, below, includes data for the tests in FIGS. 12A-12D.

TABLE 2

| Adsorption Temperature | Inlet Propylene Adsorbed | Inlet Toluene Adsorbed | Propylene turned to coke on TPD | Toluene turned to coke on TPD | Stored HC into CO and $CO_2$ on TPD | Stored HC Burned-out as CO and $CO_2$ | 50% $T_{out}$ Coke Burned-out as $CO_2$ |
|---|---|---|---|---|---|---|---|
| 30° C. | 87% | 47% | 0% | 6% (600) | 9% (5400) | 0% | — |
| 150° C. | 89% | 13% | 5% (1600) | 33% (900) | 11% (5800) | 2% (1100) | 492° C. |
| 200° C. | 86% | 15% | 16% (5500) | 24% (832) | 11% (6000) | 4% (2100) | 485° C. |
| 250° C. | 91% | 15% | 32% (10600) | 62% (2100) | 10% (5100) | 11% (5600) | 477° C. |
| 300° C. | 91% | 14% | 55% (19000) | 60% (2000) | 24% (13000) | 13% (6800) | 484° C. |

While the layered and mixed zeolite HC traps disclosed above are described as having two types of zeolites, there may be additional types of zeolites. For example, there may be 3, 4, 5 or more types of zeolites. There may be two or more storage zeolites and/or two or more coking zeolites. Similar to above, the three or more types of zeolites may be layered or they may be mixed, or a combination thereof. For example, two storage zeolite layers may sandwich a coking zeolite layer, or vice versa. There may a plurality of each type of zeolite arranged in alternating layers.

With reference to FIG. 11, a schematic diagram showing the operation of the multiple zeolite HC traps is shown. While the process is described above in detail with regards to specific BEA and CHA zeolites, FIG. 11 shows the process for storage and coking zeolites, generally. When the exhaust stream begins, the HC trap may be at ambient temperature, or slightly higher. In FIG. 11, the temperature is shown as 30° C. Hydrocarbons 40, such as toluene, may be trapped in the pores of a storage zeolite 42. The HC 40 may remain trapped in the storage zeolite 42 as the temperature of the zeolite rises. At a certain temperature, such as at about 250° C., the storage zeolite 42 may release the HCs 40. The released HCs 40 may then contact an active site 44 on or inside the coking zeolite and form coke molecules 46. For example, the active site 44 may include copper or other metal cations used for coking agents and/or a PGM metal for coke oxidation For coking zeolites that have pore sizes that are too small for the HCs 40 to be trapped, the active sites 44 may be located on the surface of the zeolite.

Figure 12B:
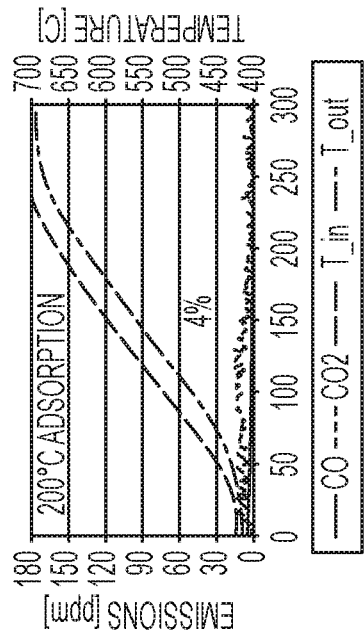
FIGS. 12A, 12B, 12C, and 12D are example data from lean burn-out tests of a copper-chabazite zeolite using adsorption/desorption temperatures of 150° C., 200° C., 250° C. and 300° C., respectively.
Figure 12D:
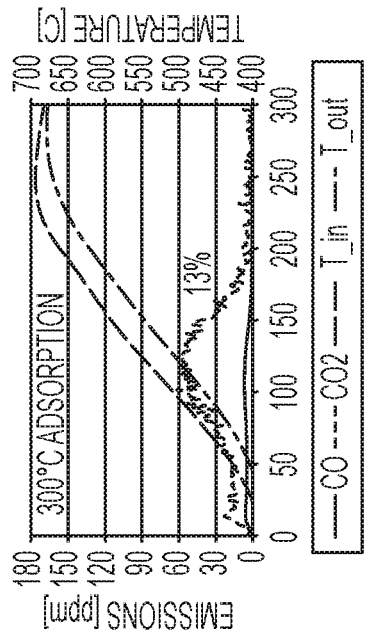
Figure 12A:
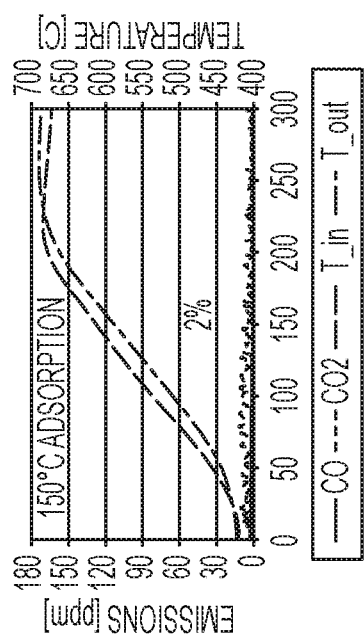
Figure 12C:
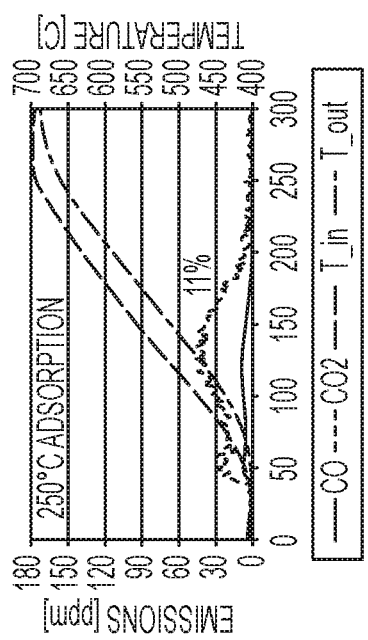

As described above, one of the mechanisms that may provide the coke-forming effect of the multiple zeolite HC trap is that the storage zeolite (the primary zeolite) may release the HCs at or above a certain temperature. Below this temperature, there may be no coke formation by the coking zeolite (the secondary zeolite). FIGS. 12A-12D shows lean burn-out data for a Cu-CHA zeolite (e.g., a possible secondary zeolite) that demonstrates this temperature based phenomena. FIGS. 12A-12D show the impact of the adsorption temperature of the Cu-CHA zeolite, which also simulates the temperature of desorption from the primary zeolite in the multiple zeolite HC-trap. As shown in FIGS. 12A and 12B, at adsorption temperatures up to 200° C. there were no peaks of CO or $CO_2$ observed, which demonstrated little to no coke formation by the secondary zeolite. In FIG. 12C, the adsorption temperature of 250° C. showed a significant $CO_2$ peak occurs at about 480° C. during the burn-out, indicating there was low-temperature coke formation. FIG. 12D shows that the coke formation is even greater for an adsorption temperature of 300° C. Accordingly, the release temperature Accordingly, an HC-trap having multiple zeolites has been discovered to form coke, even when the two zeolites do not form coke individually. Through different mechanisms, there may be at least two forms of coke generated—low-temperature coke and high-temperature coke. The low temperature coke burns/combusts at temperatures that are common during vehicle operation in the underbody converter location, including during drive cycle standards. For example, the low temperature coke may burn at under 550° C. or under 500° C., such as at about 480° C. The high temperature coke burns at a higher temperature, for example, above 550° C. or 600° C., such as about 650° C. It has been found that, in at least some circumstances, high temperature coke may be formed within the storage zeolite and low temperature coke may be formed when HCs are released from a storage zeolite and react with a coking zeolite. To form low-temperature coke, it may therefore be preferable to use a storage zeolite that releases HCs at a relatively high temperature (e.g., 250° C. or greater).

As demonstrated above, "fresh" (exposed up to 700° C. in dry air) multiple zeolite HC-traps may form and burn coke. It has been found that "aged" (exposed up to 850° C. in steam) HC-traps having multiple zeolites are still effective at forming and burning coke, but it may occur less efficiently. However, this is not unusual, since HC-trap performance generally deteriorates with aging. Reasons for the reduced effectiveness with age may be that the storage zeolite desorbs HCs at a lower temperature or the coking zeolite may form coke less efficiently. Even with reduced effectiveness, however, the multiple zeolite HC-traps are still able to form and burn coke, where none was formed or burned with the zeolites individually.

Multiple zeolite HC-traps are described above, which may include at least one storage zeolite and at least one coking zeolite. The storage zeolite may have pore sizes/diameters that are suited to adsorbing and trapping HC species such as toluene and propylene. The storage zeolite may also be configured to hold the HCs to at least a certain temperature before releasing them (e.g., to react with the coking zeolite). In at least one embodiment, the release temperature may be raised by adjusting the $Si/Al_2$ ratio of the storage zeolite. As described in incorporated application U.S. Ser. No. 14/831,075, a lower $Si/Al_2$ ratio may increase the release temperature of the zeolite. For example, instead of using a high $Si/Al_2$ ratio BEA (e.g., 300±200), the $Si/Al_2$ ratio may be reduced to 20-50 or 25-38. In another embodiment, the $Si/Al_2$ ratio of the coking zeolite may also be reduced. In one embodiment, the Si/Al$_2$ ratio of the coking zeolite may be lower than the storage zeolite. In another embodiment, the Si/Al$_2$ ratio of the coking zeolite may be from 5 to 30, or any sub-range therein, such as 5 to 25, 5 to 20, 5 to 15, or 5 to 10.

In at least one embodiment, one or more metals or metal ions may be introduced into the storage zeolite prior to mixing or layering it with the coking zeolite. As described above, it has been discovered that some metal ions (e.g., Cu) may migrate from the coking zeolite to the storage zeolite when they are in close proximity (e.g., mixed or layered). In order to block the migration, metal ions may be introduced into the storage zeolite prior to combining with the coking zeolite, thereby occupying the sites and preventing ions from the coking zeolite from impregnating or ion-exchanging with the storage zeolite. As described in incorporated application U.S. Ser. No. 14/831,075, certain metal ions may ion-exchange more readily than others. For example, if nickel and copper ions are introduced into a zeolite at the same time, the nickel may preferentially exchange with the zeolite and prevent copper from exchanging at the same quantity.

Accordingly, if sufficient metal ions are introduced into the storage zeolite to occupy all or substantially all of the ion-exchange sites, then little or no metal ions from the coking zeolite may be able to occupy the storage zeolite when they are combined. Any metal ions that may occupy the ion-exchange sites and prevent significant exchange of metal ions from the coking zeolite may be used. For example, ions of transition metals may be used, such as nickel or manganese. Alternatively, Group 1A metals, such as lithium, sodium, or potassium may be used. A single metal ion species may be introduced or any combination of the above. These metal ions may be present in quantities that ensure the ion-exchange sites are full. This may depend on an atomic ratio of the metal to aluminum in the zeolite. For example, for Cu-CHA, a Cu/Al atomic ratio of greater than 0.2 may result in any additional copper ions being catalytic, which suggests a new exchange site that may be "loose," or able to be reduced to Cu$^0$ and perhaps removed from the exchange site. This ratio may change depending on the metal ions being introduced, but the amount of the metal ions introduced may be equal to or greater than the amount necessary to be above the threshold.

In one embodiment, the storage zeolite may include from 1 to 10 wt. % metal ions, or any sub-range therein, prior to any mixing and/or layering with the coking zeolite. For example, the storage zeolite may include from 2 to 8 wt. %, 3 to 8 wt. %, 5 to 10 wt. %, 4 to 8 wt. %, or 5 to 8 wt. % metal ions prior to any mixing/layering. In another embodiment, the storage zeolite may include at least 2, 3, 4, or 5 wt. % metal ions prior to any mixing and/or layering with the coking zeolite. As described above, the metal ions may be transition metals, Group 1A, or other metals, such as platinum group metals.

Figure 13:
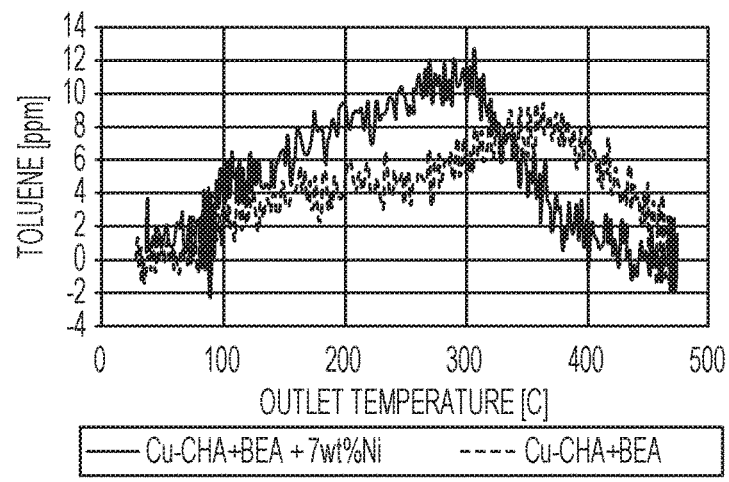
FIG. 13 is an example of a toluene desorption curve for a copper-chabazite and beta zeolite mixture with and without added nickel to the beta zeolite.
Figure 14:
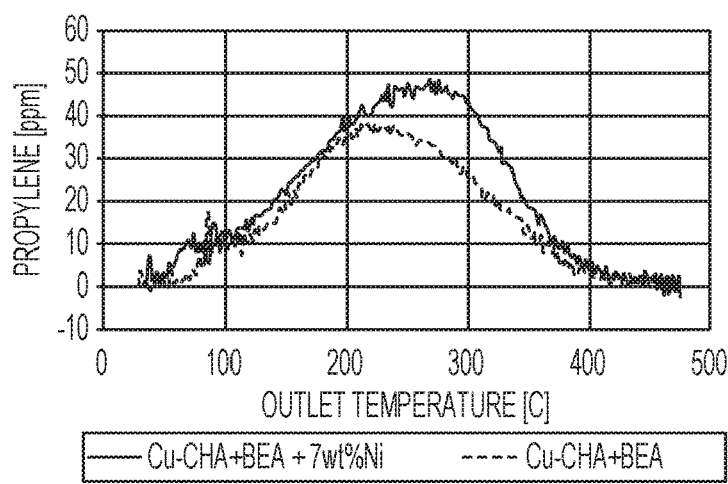
FIG. 14 is an example of a propylene desorption curve for a copper-chabazite and beta zeolite mixture with and without added nickel to the beta zeolite.
Figure 15:
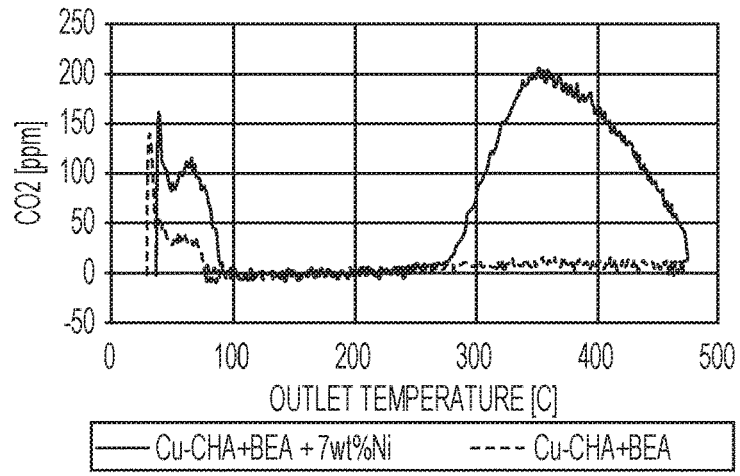
FIG. 15 is an example of $CO_2$ emissions as a function of temperature for a copper-chabazite and beta zeolite mixture with and without added nickel to the beta zeolite.
Figure 16:
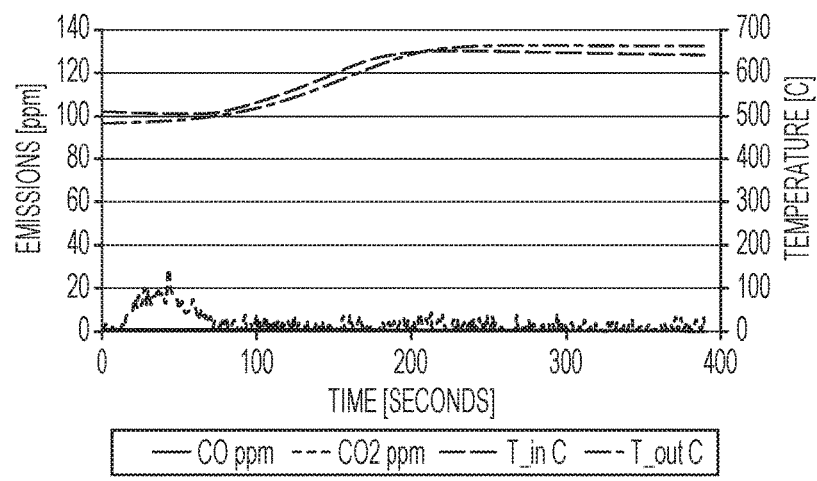
FIG. 16 is an example of lean burn-out emissions for a copper-chabazite and beta zeolite mixture with and without added nickel to the beta zeolite.

With reference to FIGS. 13-16, data is shown comparing the impact of adding 7 wt. % nickel (Ni) to the storage zeolite. In this example, the baseline sample is similar to the storage zeolite in previous examples, high Si/Al$_2$ ratio BEA for the storage zeolite and low Si/Al$_2$ ratio Cu-CHA for the coking zeolite. FIGS. 13 and 14 show desorption graphs for the baseline BEA and for BEA with 7 wt. % Ni added. As shown, for both toluene and propylene there are only small shifts in the desorption temperature. With reference to FIG. 15, CO$_2$ emissions are plotted against the outlet temperature. As shown, the HC trap with Ni included burned a significantly larger amount of coke, with a peak at about 350° C. With reference to FIG. 16, a lean burn-out test is shown for the sample of Cu-CHA (low Si/Al$_2$ ratio)+Ni-BEA (high Si/Al$_2$ ratio). As shown, there is very little residual coke left to burn at high temperatures (e.g., above 500° C.). This data can be compared to the data in FIG. 5, which is the same HC trap, minus the added Nickel. As shown in FIG. 5, there is still a significant amount of coke to be burned at high temperatures. Table 3, below, shows data comparing the baseline sample and the sample with added Nickel. As shown, the addition of nickel significantly reduced the coke burning temperature in both the fresh and aged conditions.

TABLE 3

| high Si/Al$_2$ ratio BEA/ Cu-CHA Sample | Inlet Propylene Adsorbed | Inlet Toluene Adsorbed | Propylene turned to coke on TPD | Toluene turned to coke on TPD | Stored HC into CO and CO$_2$ on TPD | Stored HC Burned-out as CO and CO$_2$ | 50% T$_{out}$ Coke Burned-out as CO$_2$ |
|---|---|---|---|---|---|---|---|
| Fresh | 94% (36828) | 93% (24184) | 13% (4970) | 53% (12761) | 3% (2608) | 18% (17571) | 537° C. |
| Fresh + 7 wt % Ni | 93% (34694) | 92% (23376) | 16% (5458) | 50% (11830) | 27% (24846) | 1% (1353) | 492° C. |
| Aged | 92% (36612) | 92% (24680) | 0% | 10% (2535) | 2% (1700) | 4% (4172) | 618° C. |
| Aged + 7 wt % Ni | 89% (34022) | 91% (22425) | 0% | 10% (2134) | 2% (2066) | 4% (2712) | 540° C. |

In at least one embodiment, metals from the platinum group (platinum group metals or PGM) may be incorporated into the storage and/or coking zeolites. The platinum group metals include ruthenium, rhodium, palladium, osmium, iridium, and platinum. A single species or a combination of species may be included. In one embodiment, one or more of palladium (Pd), platinum (Pt), and rhodium (Rh) may be incorporated into the storage and/or coking zeolite. The platinum group metals may help to burn the coke in the multiple zeolite HC-trap. For example, the PGM may burn the coke at a lower temperature and/or burn the coke more completely in the exhaust system constrained environment. In one embodiment, the storage zeolite and/or the coking zeolite may include from 0.1 to 5.0 wt. % PGM, or any sub-range therein, such as 0.3 to 4.0 wt. %, 0.5 to 3.5 wt. %, 0.5 to 2.5 wt. %, 1.0 to 3.5 wt. %, or 1.0 to 3.0 wt. %. In another embodiment, the storage zeolite and/or the coking zeolite may include at least 0.5, 1.0, 1.5, or 2.0 wt. % PGM. Alternatively for a zeolite with a Si/Al$_2$ of 20 to 50, the PGM/Al atomic ratio may be 0.01 to 0.1.

Numerous embodiments are disclosed for both the storage zeolite and the coking zeolite. Based on the present disclosure, one of ordinary skill in the art will understand that any of the storage zeolites may be combined with any of the coking zeolite embodiments, and vice versa. In addition, HC-traps including more than two zeolite types are disclosed. Similarly, it is to be understood that any combination of the storage zeolites may be used and/or any combination of the coking zeolites may be used in an HC-trap having more than two zeolite types.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hydrocarbon trap, comprising:
    beta zeolite (BEA) material having an average pore diameter of at least 5.0 angstroms and a $Si/Al_2$ ratio of 10 to 90, and including from 0.1 to 10 wt. % Ni ions; and
    a copper chabazite zeolite (Cu—CHA) material having an average pore diameter of less than 5.0 angstroms and a $Si/Al_2$ ratio of 100 to 500.

2. The trap of claim 1, wherein the BEA material has a $Si/Al_2$ ratio of 20 to 50.

3. The trap of claim 1, wherein the Cu—CHA material has a $Si/Al_2$ ratio of 5 to 20.

4. The trap of claim 1, wherein one or both of the BEA and Cu—CHA materials include at least 0.5 wt. % platinum group metals.

5. The trap of claim 1, further comprising a third zeolite material having a different composition than the BEA and Cu—CHA materials.

6. The trap of claim 1, wherein a $Si/Al_2$ ratio of the BEA material is from 20 to 50 and the BEA material includes at least one of a platinum group metal (PGM) and a Group 1A metal.

7. A hydrocarbon trap, comprising:
    a beta zeolite (BEA) layer having an average pore diameter of at least 5.0 angstroms and a $Si/Al_2$ ratio of 10 to 90, and including from 0.1 to 10 wt. % Ni ions; and
    a copper chabazite zeolite (Cu—CHA) layer having an average pore diameter of less than 5.0 angstroms and a $Si/Al_2$ ratio of 100 to 500.

8. The trap of claim 7, wherein the Cu—CHA) layer is disposed over the BEA layer and a three-way catalyst layer is disposed over the Cu—CHA layer.

9. A hydrocarbon trap, comprising:
    a zeolite mixture including a beta zeolite (BEA) material interspersed with a copper chabazite zeolite (Cu—CHA) material;
    the BEA material having an average pore diameter of at least 5.0 angstroms and a $Si/Al_2$ ratio of 10 to 90, and including from 0.1 to 10 wt. % Ni ions; and
    the Cu—CHA material having an average pore diameter less than 4.5 angstroms and a $Si/Al_2$ ratio of 100 to 500.

10. The trap of claim 9, wherein the BEA material does not include substantially any ion-exchanged copper ions and the Cu—CHA material includes at least 2 wt. % copper.

11. The trap of claim 1, wherein the Cu—CHA material includes 2 to 4 wt. % Cu.

12. The trap of claim 7, wherein the Cu—CHA material includes 2 to 4 wt. % Cu.

13. The trap of claim 7, wherein the ratio of the size of the BEA layer to the Cu—CHA layer is from 1:9 to 9:1.

14. The trap of claim 7, wherein the ratio of the size of the BEA layer to the Cu—CHA layer is from 1:7 to 7:1.

15. The trap of claim 7, further comprising a third zeolite layer having a different composition than the BEA and Cu—CHA layers.

16. The trap of claim 7, wherein one or both of the BEA and Cu—CHA layers include at least 0.5 wt. % platinum group metals.

17. The trap of claim 7, wherein the BEA material has a $Si/Al_2$ ratio of 20 to 50.

18. The trap of claim 7, wherein the Cu—CHA material has a $Si/Al_2$ ratio of 5 to 20.

19. The trap of claim 9, wherein the BEA material has a $Si/Al_2$ ratio of 20 to 50.

20. The trap of claim 9, wherein the Cu—CHA material has a $Si/Al_2$ ratio of 5 to 20.

* * * * *